United States Patent [19]

Walles et al.

[11] Patent Number: 5,082,740
[45] Date of Patent: Jan. 21, 1992

[54] PLASTIC CLAD METAL LAMINATE FOR HEAT TRANSFER PARTITIONS

[75] Inventors: Wilhelm E. Walles, Freeland, Mich.; Felix Achille, Reynoldsburg, Ohio; Terry H. Fiero, Newark, Ohio; Steve D. Gregory, Worthington, Ohio; Timothy O. Kirch, Newark, Ohio; Bradley D. Stevens, Frazeysburg, Ohio

[73] Assignee: The Dow Chemical Company, Midland, Mich.

[21] Appl. No.: 499,849

[22] Filed: Mar. 26, 1990

[51] Int. Cl.$^5$ .................. B32B 15/08; B32B 15/04; B32B 27/36
[52] U.S. Cl. ............................ 428/461; 428/457; 428/480
[58] Field of Search ............... 428/215, 457, 461, 349, 428/336, 480; 525/333.9; 524/211; 202/236, 172; 156/325

[56] References Cited

U.S. PATENT DOCUMENTS

| | | | |
|---|---|---|---|
| 3,860,492 | 1/1975 | Lowi, Jr. et al. | 202/236 |
| 4,363,703 | 12/1982 | ElDifrawi et al. | 202/172 |
| 4,449,014 | 5/1984 | Brezinsky | 428/336 |
| 4,666,452 | 5/1987 | Nohr et al. | 525/333.9 |
| 4,832,115 | 5/1989 | Albers | 165/104.31 |

OTHER PUBLICATIONS

Research Disclosures, 25938, Nov. 1985.

Primary Examiner—John Kight, III
Assistant Examiner—Shelley A. Wright

[57] ABSTRACT

A water wettable corrosion resistant plastic clad metal laminate suitable for forming into heat transfer partitions for use in apparatus for simultaneous heat and mass transfer.

13 Claims, 1 Drawing Sheet

PLASTIC CLAD METAL LAMINATE FOR HEAT TRANSFER PARTITIONS

BACKGROUND OF THE INVENTION

The present invention relates to a plastic clad metal laminate suitable for use in forming heat transfer partitions for apparatus capable of simultaneous heat and mass transfer More particularly it relates to such a plastic clad metal laminate usefully employed in the construction of an apparatus for cooling and conditioning air used in habitable dwellings, i.e., an air conditioner.

In U.S. Pat. No. 4,832,115 to Walter F. Albers, et al. there is disclosed an apparatus for simultaneous heat and mass transfer In particular there is disclosed an apparatus for changing at least one selected property of two wetting substances, said apparatus comprising one or more heat transfer partitions as well as associated means for moving air, wetting means, etc. In the embodiment of the foregoing apparatus particularly adapted for use in conditioning air for habitable dwellings the aforementioned heat transfer partitions generally describe a compartment and may be subjected to heating or cooling by contacting with a heat transfer medium particularly brine or salt solution. In the aforementioned patent at column 2, lines 49-51 it is disclosed that heat transfer partitions can be made of inexpensive plastic film or metal foils.

Disadvantageously when the aforementioned plastic film or metal foils are employed as a heat transfer partition in an apparatus for simultaneous heat and mass transfer, particularly one involving the movement of air in contact with such heat transfer partitions, plastic film or metal foils have proven unacceptable for use. In particular metal foils usually possess insufficient resistance to corrosive effects of the brine or water employed for heat transfer means. Plastic films on the other hand although noncorrosive have higher heat capacities, and lower thermal conductivities compared to metals. They have proven unacceptable in through that when prepared in a suitably thin section necessary for adequate heat conduction through the heat transfer partition, the plastic has insufficient strength to resist damage or vibration due to the motion of air past the heat transfer partition. In addition, in an embodiment whereby increased surface area is provided by folding the heat transfer partition in parallel folds or pleats, plastic film is difficult to form into permanent creases.

A further difficulty with the use of inexpensive plastic film is the fact that generally insufficient heat transfer from the wetting substance results due to the fact that many thermoplastic resin film surfaces are hydrophobic. This fact prevents the water or brine solution from forming a continuous wetting surface on the heat transfer partition to maximize for improved heat conduction.

Lastly it is desirable in the construction of a suitable apparatus for simultaneous heat and mass transfer to prevent formation of microbiological growth such as fungal or bacterial growth on the heat transfer partitions. Not only does such microbial growth inhibit heat transfer through the heat transfer partition but certain microbiological organisms are also considered to be injurious to human health, such as Legionnaires Bacterium which has been found to be capable of growth in wet environments involving mist and recycling of water.

Thus it would be desirable if there were provided a material suitable for forming into heat transfer partitions for use in apparatus for simultaneous heat and mass transfer which is capable of efficient transfer of heat therethrough and is resistant to vibration or damage caused by the motion of air or liquid at high velocity, which additionally is easily fabricated or formed into pleated or folded sections having increased surface area for contact with the moving air or liquid heat transfer medium.

In addition it would be desirable if there were provided a material suitable for forming into heat transfer partitions that has a surface wettability to achieve rapid and thorough dispersion of aqueous heat transfer solutions or water in order to achieve efficient heat transfer.

Finally it would be highly desirable that this material be corrosion resistant to brine and aqueous medium.

SUMMARY OF THE INVENTION

According to the present invention there is provided a plastic clad, metal laminate suitable for forming into heat transfer partitions for use in apparatus for simultaneous heat and mass transfer, said laminate comprising a metal substrate of a thickness of from 0.001 to 0.1 inch (0.025 to 2.5 mm) having adhered to one or both sides thereof a thermoplastic resin layer of a thickness of from 0.00001 to 0.003 inch (0.00025 to 0.050 mm) comprising one or more sublayers of one or more thermoplastic resins with one sublayer forming an exposed surface having a surface wettability as measured by ASTM D-2578 of at least 50 dyne/cm.

In a further embodiment of the present invention the exposed sublayer surface is resistant to microbial growth.

DETAILED DESCRIPTION OF THE INVENTION

The construction and method of use of the apparatus for simultaneous heat and mass transfer are fully disclosed in U.S. Pat. Nos. 4,832,115, 3,860,492, and 4,363,703, the teachings of which are herein incorporated in their entirety by reference thereto. Such apparatus have attained energy savings of 50 percent or more compared to similar apparatus employing compressors and also employing chlorofluorocarbon refrigerants. Accordingly it is projected that such apparatus may become of increased commercial importance as such efficiencies in energy utilization and avoidance of chlorofluorocarbon refrigerants are fully realized.

Figure 1:
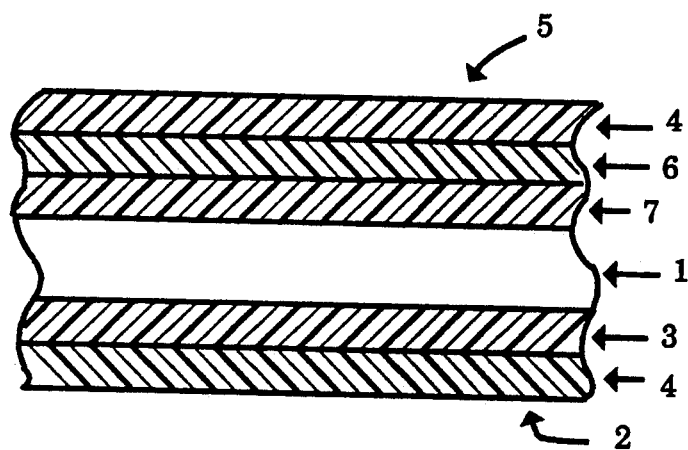
FIG. 1 depicts a laminate according to the invention.

The construction of the present invention in one embodiment is readily illustrated by reference to FIG. 1 wherein an edge view of a section of laminate is illustrated. Depicted are the metal substrate, 1, having adhered to one major surface thereof thermoplastic resin layer, 2, comprising sublayers, 3 and 4 wherein 4 is a surface sublayer and 3 is a suitable thermoplastic adhesive for lamination of the thermoplastic resin layer, 2, to the metal substrate. On the remaining surface of the metal substrate, 1, there is adhered thermoplastic resin layer, 5, comprising: a surface sublayer, 4, and an intermediate layer, 6. The thermoplastic resin layer, 5, is adhered to the metal substrate, 1, by means of an adhesive, 7.

Any metal or metal alloy having suitable strength characteristics may be employed as the metal substrate in the present invention. Examples include steel, aluminum, copper, bronze, etc. Preferred metals include steel, particularly tin-free steel and aluminum. Most preferably the metal substrate has a thickness from 0.005 to 0.050 inch (0.025 to 0.125 mm).

The thermoplastic resin layer is generally prepared by one of the suitable film forming processes such as the blown film or extrusion casting technique. Suitable resins that will adhere to metals by extrusion coating or heat bonding include the well known copolymers of an α-olefin and a polar comonomer such as acrylic acid, methacrylic acid, $C_{1-4}$ esters of acrylic acid or methacrylic acid, carbon monoxide, vinyl acetate, etc. Additional suitable metal adherent thermoplastic resins include grafted or chemically modified olefin polymers, in particular polymers and copolymers of ethylene modified by grafting, reacting or blending with anhydride monomers or anhydride containing copolymers. Such compositions may additionally include rubbery materials. Such a class of compounds are commercially available under the trade name Plexar, available from Quantum Chemical.

The thermoplastic resin layer may be comprised of single or multiple sublayers of one or more thermoplastic resins. The multilayered thermoplastic films are prepared according to known techniques in the art such as feed block coextrusion or other suitable technique. The extruded film may be drawn and oriented by bubble expansion, calendering or other known techniques. Multiple layer films may be prepared in order to provide an exposed surface layer having different properties such as surface wettability, abrasion resistance or toughness from the sublayer in contact with the metal substrate: to employ less expensive resins in the thermoplastic resin layer construction: to bury scrap resin in an intermediate layer that will not affect film properties. The use of such multilayered film construction is a preferred embodiment of the present invention.

Resins that may be suitably employed as an exposed surface layer include the foregoing copolymers of an α-olefin and a polar comonomer and grafted or chemically modified olefin polymers as well as copolymers of vinyl aromatic monomers particularly block copolymer of vinyl aromatic monomers and conjugated diolefins, such as block copolymers of styrene and butadiene; polyesters, especially polyethylene terephthalate, and compatible blends of the foregoing resins.

Often due to the inability of certain resins used in the exposed surface layer to bond adequately to the sublayer in contact with the metal substrate, one or more intermediate layers of resins designed to achieve interlayer adhesion may be employed. Typically such intermediate layers are comprised of resins selected from the group consisting of polyethylene and ethylene copolymers (high density, low density, linear low density and ultra low density polyethylenes); copolymers of an α-olefin and a polar comonomer and grafted or chemically modified olefin polymers. Often the intermediate resin comprises a blend of the resins employed in the sublayer contacting the metal and the surface layer.

In order to provide desired wettability to the outer surface of the metal adherent thermoplastic resin layer it may be desirable to employ a chemically modified thermoplastic resin in the sublayer which constitutes the surface of the resulting plastic clad metal laminate. For example it has been discovered that thermoplastic resins which normally are difficultly sulfonatable may result in the formation of a surface that is more readily water wettable by incorporation therein of aromatic compounds which are easily sulfonated. By incorporating such compounds only in the sublayer that will constitute the surface layer, it is possible to reduce the quantity of sulfonating agents employed in preparing the sulfonated polymer and to contain the sulfonated agents only in the surface layer, so as not to effect metal adhesion or other properties of the thermoplastic resin layer.

The aromatic compounds that may be added, particularly to olefin resins, to provide enhanced surface wettability upon sulfonation, may be inert aromatic compounds serving no other purpose in the thermoplastic resin formulation or they may be phenolic type antioxidants or aromatic dyes or coloring pigments which are coincidentally subject to sulfonation. For example it has now been discovered that phenolic antioxidants, such as alkyl substituted phenolic compounds or phenolic ethers or thioethers, are readily sulfonated when incorporated into a thermoplastic resin and exposed to standard sulfonation conditions. Similarly pigments such as the phthalocyanine blue having a structure corresponding to the following figure are also subject to sulfonation.

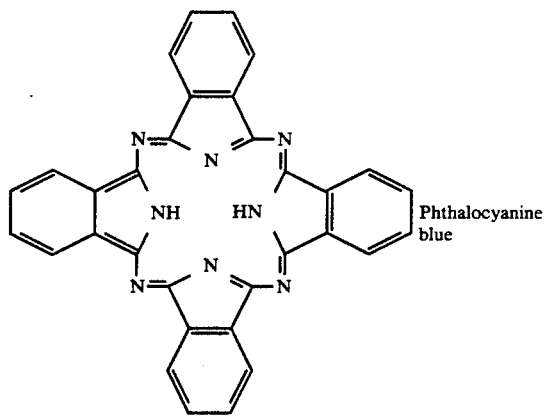

Phthalocyanine blue

Not only are the foregoing aromatic compounds useful for antioxidation, coloring or other purposes, but the same allow the normally poorly sulfonatable olefin polymer film to attain a satisfactory level of sulfonation.

Sulfonation of the thermoplastic resin film in one embodiment is obtained by contacting the film, preferably predominantly on one side thereof, with sulfur trioxide, preferably gaseous sulfur trioxide. The process may be conducted in a batch or a continuous manner. The sulfur trioxide may be diluted with a suitable medium, preferably an inert volatile compound such as a chlorofluorocarbon. Where the surface layer of the thermoplastic resin film contacted with the sulfonating agent comprises an alkenyl aromatic resin, or the aforementioned aromatic compounds, suitable surface wettabilities can be obtained with films containing an aromatic content (monomer or additive) of from 0.050 to 10 percent based on resin weight, with a resin film exposure time of from 0.01 sec to 10 minutes at a concentration of sulfonating agent of from 1 to 10 weight percent in the atmosphere contacting the film surface. Any suitable technique for sulfonating the thermoplastic resin film may be employed, such as the conditions disclosed in U.S. Pat. No. 4,615,914 or 4,902,493.

Figure 2:
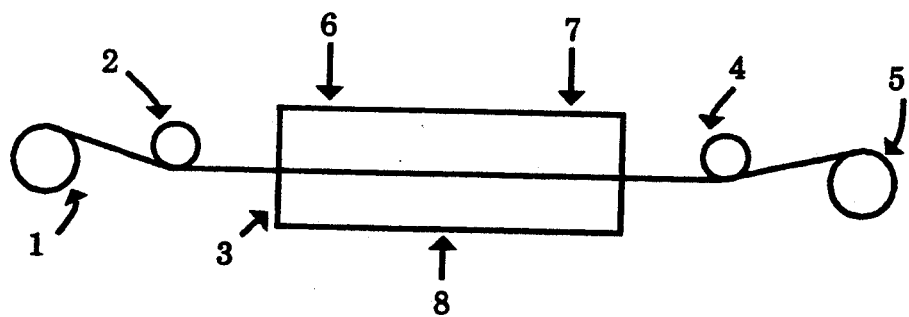
FIGS. 2 depicts in schematic form a continuous process for sulfonating a thermoplastic resin film for use in forming the thermoplastic resin layer in laminate of the present invention.

Reference is now made to FIG. 2 wherein there is depicted a continuous film sulfonation process. In the process a film of the desired thermoplastic resin from supply roll, 1, is passed by guide roller, 2, through a sulfonation chamber, 3, by the guide roller, 4, onto uptake roller 5. The film causes substantially complete bifurcation of the sulfonation chamber, 3. Sulfonating agent atmosphere is introduced on one side of the film by source 6, and dry air or inert gas is introduced at source 8, into the opposite side of the bifurcated chamber. The inert gas prevents substantial contact of sulfonating agent with the side of the thermoplastic resin film opposite to the sulfonating agent atmosphere. A neutralizing agent, such as ammonia, may be introduced at the final stages of the sulfonation via line, 7, to neutralize the sulfonating groups formed on the film surface. Alternatively, concurrently or additionally, an antimicrobial agent may be introduced into the thermoplastic resin surface. Preferably this addition is simultaneous with or as a result of the neutralization process. By utilizing multiple layer thermoplastic resin films containing relatively easily sulfonated groups or polymers on only the surface sublayer in combination with this sulfonation chamber design, it is possible to substantially sulfonate only one side of the thermoplastic resin film.

As previously mentioned, following sulfonation of the surface layer of the thermoplastic resin, it is desirable to neutralize the sulfonic acid groups present on the film surface. Such neutralization may be readily done by contacting the resin surface with a suitable amine or ammonia or other suitable neutralizing agent such as a metal halide. Preferred neutralizing agents are $C_{1-6}$ alkyl or aryl amines particularly tertiary amines and ammonia. In a preferred embodiment of the invention the alkenyl aromatic monomer containing resin or aromatic compound is added to the thermoplastic resin forming the surface sublayer of the thermoplastic resin layer in an amount to provide from 0.5 to 10 percent by weight of sulfonated neutralized aromatic functionality. A desirable feature according to the present invention is that the thermoplastic resin layer film may be first sulfonated and thereafter laminated to the metal substrate without detrimental effect to the lamination process. This allows the operator to avoid exposing the metal containing laminate to further mechanical handling and possible contact with the corrosive sulfonation environment. Suitable systems for laminating include the method of heat lamination in which the thermoplastic resin layer film is contacted with the surface of the heated metal substrate. In addition adhesive resins may be employed to coat the substrate or thermoplastic resin layer prior to contacting with the metal substrate. Whether or not the technique of heat lamination or use of an adhesive resin is employed, it is desirable that the thermoplastic resin layer be adhered to the metal substrate by force of at least 1 to and preferably 5 pounds per lineal inch as determined according to ASTM F-88.

Preferred plastic clad metal laminates according to the present invention possess a surface wettability of at least 55 dynes/cm. In addition to the foregoing technique of sulfonation, other suitable additives or methods may be employed to increase the surface wettability of the thermoplastic resin layers employed in the present invention. For example the use of antimicrobial agents to increase resistance to microbial growth may at the same time improve the surface wettability of the polymeric resins employed according to the present invention.

The technique of incorporating antimicrobial agents into thermoplastic resins to provide polymers having improved resistance to microbiological organisms is previously known and taught in the art. Examples of suitable antimicrobial agents, include bacteriostatic, fungistatic, virostatic, algistatic, sporostatic, and tuberculostatic agents which may be incorporated into or coated onto the surface sublayer or entire thermoplastic resin layer. More particular examples of antimicrobiological agents are silanes, siloxanes, quaternary ammonium compounds, silicone containing quaternary ammonium compounds, etc These and other compounds and techniques for rendering surfaces effective in controlling microbial growth are disclosed in U.S. Pat. Nos. 4,847,088, 4,631,297, 4,632,273, 4,259,103, 4,377,608 and 3,817,739 the teachings of which are incorporated herein in their entirety by reference thereto. In a preferred embodiment of the present invention it is particularly desirable that the surface sublayer of the thermoplastic resin layer substantially prevent growth of bacteria, particularly the Legionnaires bacterium. In this regard it should be noted that improved antimicrobial activity of the present invention is achieved due to the fact that the surface wettability of the polymer surface is at least 50 dyne/cm, thereby allowing thorough contact between the entire film surface containing the antimicrobial agent and the wetting medium.

After having been prepared in sheet form, the laminate according to the present invention may be cut into any suitable size for formation into the heat transfer partitions for use in the apparatus for simultaneous and mass transfer as previously disclosed. Preferably the laminate is formed into a multiplicity of parallel folds so as to increase the total surface area exposed to the heat transfer medium and air or other mass being heated or cooled. Because of the metal substrate contained in the laminate of the present invention, such folding or pleating operation renders the article permanently formed into the desired folded or pleated shape having high surface area. The pleating or folding serves to give the laminate increased surface area and structural strength to resist vibration or damage by moving air or aqueous solution.

What is claimed is:

1. A plastic clad metal laminate suitable for forming into heat transfer partitions for use in an apparatus for simultaneous heat and mass transfer said laminate comprising a metal substrate of a thickness from 0.001 to 0.1 inch (0.025 to 2.5 mm) having adhered to one or both sides thereof a metal adherent thermoplastic resin layer of a thickness of from 0.00001 t 0.003 inch (0.00025 to 0.050 mm) comprising one or more sublayers of one or more thermoplastic resins with one sublayer forming an exposed surface having a surface wettability as measured by ASTM D-2578 of at least 50 dyne/cm, said thermoplastic resin of said sublayer comprising a sulfonated, neutralized, aromatic monomer containing resin or aromatic compound.

2. A laminate according to claim 1 having a surface wettability of at least 55 dyne/cm.

3. A laminate according to claim 1 wherein the metal is steel or aluminum.

4. A laminate according to claim 1 wherein the sulfonation is caused by contacting the thermoplastic resin surface with SO₃ followed by neutralization with ammonia.

5. A laminate according to claim 1 wherein the surface sublayer comprises a sulfonated, neutralized phenolic or phthalooyanine compound.

6. A laminate according to claim 1 wherein the surface sublayer comprises an ethylene homopolymer or copolymer and from 0.5 to 10 percent by weight of sulfonated neutralized aromatic compound.

7. A laminate according to claim 1 comprising a multiplicity of parallel folds.

8. A laminate according to claim 1 wherein the metal adherent thermoplastic resin layer is sulfonated on the surface to be exposed and the opposite surface is laminated to the metal substrate.

9. A laminate according to claim 8 wherein the thermoplastic resin layer is sulfonated by contacting an exposed surface to a gaseous mixture of SO₃.

10. A laminate according to claim 9 wherein the gaseous mixture comprises a chlorofluorocarbon.

11. A laminate according to claim 2 wherein the surface sublayer additionally comprises an antimicrobial additive.

12. A laminate according to claim 2 wherein the surface sublayer is effective to prevent growth of Legionnaires Bacterium.

13. In an apparatus for changing at least one selected property of two wetting surfaces comprising at least one heat transferring partition the improvement wherein the heat transferring partition comprises a plastic clad metal laminate according to claim 1, 7 or 11.

* * * * *